(12) United States Patent
Johnson et al.

(10) Patent No.: US 6,745,590 B1
(45) Date of Patent: Jun. 8, 2004

(54) CONDENSATE REMOVAL SYSTEM

(75) Inventors: Rollie R. Johnson, Chesterfield, MO (US); John M. McNally, Chicago, IL (US); John Bean, Wentzville, MO (US); Gregory R. Uhrhan, Columbia, IL (US); David N. Susek, St. Charles, MO (US)

(73) Assignee: American Power Conversion, West Kingston, RI (US)

(*) Notice: Subject to any disclaimer, the term of this patent is extended or adjusted under 35 U.S.C. 154(b) by 0 days.

(21) Appl. No.: 10/341,705

(22) Filed: Jan. 13, 2003

(51) Int. Cl.[7] .............................................. F25D 21/00
(52) U.S. Cl. ........................................ 62/272; 62/285
(58) Field of Search ............................ 62/190, 279, 285, 62/305

(56) References Cited

U.S. PATENT DOCUMENTS

| | | | |
|---|---|---|---|
| 4,085,893 A | 4/1978 | Durley, III | 239/102 |
| 4,941,901 A | * 7/1990 | Ramakrishnan et al. | 62/262 |
| 5,134,999 A | 8/1992 | Osipov | 128/661.03 |
| 5,164,094 A | 11/1992 | Stuckart | 210/708 |
| 5,200,666 A | 4/1993 | Walter et al. | 310/323 |
| 5,341,653 A | * 8/1994 | Tippmann et al. | 62/272 |
| 5,372,634 A | 12/1994 | Monahan | 96/175 |
| 5,467,791 A | 11/1995 | Kato et al. | 134/166 |
| 5,792,241 A | 8/1998 | Browitt | 96/52 |
| 5,836,192 A | 11/1998 | Getman et al. | 73/290 |
| 5,892,315 A | 4/1999 | Gipson et al. | 310/317 |
| 5,900,690 A | 5/1999 | Gipson et al. | 310/316 |
| 5,989,321 A | * 11/1999 | Senn | 96/134 |
| 6,148,844 A | * 11/2000 | Stamatakis | 137/179 |

* cited by examiner

Primary Examiner—Melvin Jones
(74) Attorney, Agent, or Firm—Mintz, Levin, Cohn, Ferris, Glovsky and Popeo, P.C.

(57) ABSTRACT

A condensate removal system is provided for use in association or connection with equipment that produces a liquid or condensate during operation. The condensate removal system is configured to receive a liquid or condensate produced by equipment and is configured to induce the liquid or condensate to flow from the system as liquid or condensate droplets and/or liquid or condensate vapor. The system is configured to contain and to vibrate a liquid or condensate received from equipment in an ultrasonic frequency zone to induce the liquid or condensate to form into droplets and/or vapors. The system is configured and arranged to force the droplets and vapors from the system and can be further configured to expel the droplets and vapors to an area external to the system and/or into a duct, for instance, to exhaust the droplets and vapors or to recirculate the droplets and vapor to equipment to provide cooling to the equipment and/or components of the equipment.

30 Claims, 8 Drawing Sheets

```
                    300
                       ↘         ┌─────────────────────────────────┐
                                 │   INDUCE FLOW OF CONDENSATE     │
                                 │     PRODUCED BY EQUIPMENT       │──305
                                 │        INTO A CHAMBER           │
                                 └─────────────────────────────────┘
                                                 │
                                                 ▼
                                 ┌─────────────────────────────────┐
                                 │   SELECT A FREQUENCY RANGE OF   │
                                 │ VIBRATION OF AN ULTRASONIC      │
                                 │ TRANSDUCER COUPLED TO THE       │──310
                                 │ CHAMBER AND PROVIDE POWER TO    │
                                 │ THE ULTRASONIC TRANSDUCER       │
                                 └─────────────────────────────────┘
                                                 │
                                                 ▼
                                 ┌─────────────────────────────────┐
                                 │     VIBRATE CONDENSATE WITHIN   │
                                 │   THE SELECTED FREQUENCY RANGE  │──315
                                 │    TO INDUCE CONDENSATE TO FORM │
                                 │    INTO ONE OF DROPLETS AND VAPOR│
                                 └─────────────────────────────────┘
                                                 │
                                                 ▼
                                 ┌─────────────────────────────────┐
                                 │ DRAW AIR WITHIN THE CHAMBER AND │
                                 │ THE DROPLETS AND THE VAPOR FROM │
                                 │ THE CHAMBER INTO A NOZZLE BY    │──320
                                 │ FLOWING AIR THROUGH THE NOZZLE  │
                                 │ WITH INCREASING VELOCITY AND    │
                                 │       DECREASING PRESSURE       │
                                 └─────────────────────────────────┘
                                                 │
                                                 ▼
                                 ┌─────────────────────────────────┐
                                 │ CHANNEL THE AIR AND THE DROPLETS│
                                 │ AND THE VAPOR THROUGH THE NOZZLE│──325
                                 │    TO AN AREA EXTERNAL TO THE   │
                                 │             CHAMBER             │
                                 └─────────────────────────────────┘
```

CONDENSATE REMOVAL SYSTEM

FIELD OF THE INVENTION

The invention relates to removing a liquid or condensate produced by equipment during operation.

BACKGROUND OF THE INVENTION

A common effect produced by air handling and air cooling equipment such as air conditioners and refrigeration systems is the formation of a liquid or condensate, typically water, on surfaces of the equipment and from the equipment during its operation. Methods to dispose of water condensate include allowing the condensate to drip or drain from the equipment to an area external to the equipment. Condensate freely flowing from air handling or cooling equipment, however, can cause unsightly staining and puddling on surfaces of the equipment and in areas surrounding the equipment. Condensate puddling is a source of undesirable biological growth of microbes that live naturally in moist environments such as molds, fungi, viruses and bacteria including Legionella bacteria that contaminate air and cause Legionnaires' disease in humans when inhaled. Also, other microbes naturally growing in standing water condensate release unpleasant odors to the atmosphere.

Other methods to handle and/or to dispose of water condensate include systems associated and/or integrated with air handling or cooling equipment that capture and collect the condensate for disposal, e.g., via floor drain and/or pump systems configured and arranged to connect to waste systems or sewers that service the premises at which the equipment is located. In addition, other condensate collection and disposal systems associated and/or coupled with air handling or cooling equipment retrieve and recirculate water condensate to the equipment to help cool one or more components of the equipment, e.g., a condensing heat exchanger that is cooled by condensate recirculated to the exchanger.

SUMMARY OF THE INVENTION

An object of the invention is to provide a condensate removal system for removing a liquid or condensate produced by equipment during operation by inducing the liquid or condensate to flow from the system as liquid or condensate droplets and/or vapor.

In one aspect, the invention provides a condensate removal system for use with equipment that produces condensate during operation, the system comprising a trough, the trough including a movable lid and defining a chamber and a first port, the first port configured to provide fluid communication between the chamber and an area external to the trough, the trough further providing an exhaust port, the exhaust port being configured to provide fluid communication between the chamber and an area external to the trough; a fan connected to the trough and aligned with and coupled to the first port such that the fan is in fluid communication with the chamber, the fan being configured to draw and to receive air from an area external to the trough and being further configured to force drawn-in air into the chamber such that air within the chamber is induced to flow from the chamber through the exhaust port to an area external to the trough; an inlet connected to the trough, the inlet configured to receive the condensate from the equipment and to provide the condensate into the chamber, the inlet being further disposed and configured to operatively couple to one of the equipment and a collection device associated with the equipment; and at least one ultrasonic transducer coupled to the trough to provide ultrasonic vibration to condensate contained in the trough. The equipment can include an air conditioning system and the condensate removal system can be disposed and operatively coupled to a hot side of the air conditioning system. The collection device associated with the equipment can include a condensate collection device associated with an air conditioning system, and the condensate removal system can be disposed and operatively coupled to the condensate collection device at a hot side of the air conditioning system.

The system further comprises multiple power inputs and a circuitry module electrically coupling the power inputs to the fan and the ultrasonic transducer. The ultrasonic transducer is aligned with and coupled to a second port defined by a bottom of the trough, the second port configured such that the ultrasonic transducer is in fluid communication with the chamber, the ultrasonic transducer further configured to operate in an ultrasonic frequency range.

The system can further comprise a second ultrasonic transducer coupled to the trough to provide ultrasonic vibration to condensate contained in the trough. The second ultrasonic transducer is aligned with and coupled to a third port defined by the bottom of the trough, the third port configured such that the second ultrasonic transducer is in fluid communication with the chamber, the second ultrasonic transducer further configured to operate in an ultrasonic frequency range.

The trough is constructed of a material selected from the group consisting of a metal, a plastic and a combination thereof. The material can include a plastic containing an antimicrobial agent. The system can be operatively coupled to one of: (i) cooling equipment, (ii) an air conditioning system; (iii) an air cooling system, (iv) a refrigeration system, (v) a heat pump, and (vi) a heat pump system.

In another aspect, the invention provides a condensate removal system for use with equipment that produces condensate during operation, the system comprising a housing, the housing defining a chamber and a first port, the first port configured to provide fluid communication between the chamber and an area external to the housing; an inlet connected to the housing, the inlet configured to receive the condensate from the equipment and to provide the condensate into the chamber, the inlet further disposed and configured to operatively couple to one of the equipment and a collection device associated with the equipment; and a nozzle connected to the housing and being configured such that a side of the nozzle couples to the first port and the nozzle is in fluid communication with the chamber, the nozzle comprising a tapered portion, the tapered portion being disposed and configured to induce air to flow through the tapered portion and across an area defined by the first port and being further configured such that when air flows through the tapered portion, the air increases velocity and decreases in pressure and draws air within the chamber from the chamber into the tapered portion.

The tapered portion is further configured such that the air flowing through the tapered portion induces the chamber air to flow through the tapered portion away from the housing. The tapered portion can be further configured and arranged such that the air flows across the area defined by the first port in a substantially perpendicular orientation to a direction in which the chamber air flows through the first port.

The system can further comprise an ultrasonic transducer coupled to the housing to provide ultrasonic vibration to condensate contained in the chamber. The ultrasonic transducer is aligned with and coupled to a second port defined by a bottom of the housing, the second port configured such that the ultrasonic transducer is in fluid communication with the chamber. The second ultrasonic transducer is aligned with and coupled to a third port defined by the bottom of the trough, the third port configured such that the second ultrasonic transducer is in fluid communication with the chamber. The system can further comprise multiple power inputs and a circuitry module electrically coupling the power inputs to the ultrasonic transducer.

The housing is constructed of a material containing an antimicrobial agent. The system can be operatively coupled to one of: (i) cooling equipment, (ii) a gas conditioning system, (iii) a gas cooling system, (iv) a refrigeration system, (v) a heat pump, and (vi) a heat pump system.

In a further aspect of the invention an conditioning system is provided comprising an inlet that draws air into the system; a cooling assembly to cool the air brought through the inlet into the system; an exhaust assembly to vent cool air from the system; and a condensate removal system coupled to the system including a housing defining a chamber and an inlet, the inlet configured to receive condensate produced by the system and to provide the condensate into the chamber; and means for inducing the condensate to flow from the chamber as one of droplets and vapor wherein the condensate removal system is disposed and operatively coupled to the air conditioning system at an exhaust side of the air conditioning system. The condensate removal system can be operatively coupled to a condensing heat exchanger disposed at and operatively connected to a hot side of the air conditioning system. The means for inducing the condensate to flow from the chamber as one of droplets and vapor includes an ultrasonic transducer coupled to the housing to provide ultrasonic vibration to the condensate contained in the chamber. The system can further comprise multiple power inputs and a circuitry module electrically coupling the power inputs to the air conditioning system and the ultrasonic transducer.

In one embodiment, the means for inducing the condensate to flow from the chamber as one of droplets and vapor can further include a fan coupled to the housing such that the fan is in fluid communication with the chamber, the fan being configured to draw and to receive air from an area external to the housing and to force a radially outward flow of air into the chamber such that air within the chamber and the droplets and the vapor are induced to flow from the chamber through an exhaust port provided by the housing to an area external to the housing.

In another embodiment, the means for inducing the condensate to flow from the chamber as one of droplets and vapor can further include a nozzle coupled to the housing such that the nozzle is in fluid communication with the chamber, the nozzle comprising a tapered portion, the tapered portion being disposed and configured such that when air flows through the tapered portion, the air increases velocity and decreases in pressure and draws the droplets and the vapor from the chamber into the tapered portion.

The tapered portion is further configured such that the air flowing through the tapered portion induces the droplets and the vapor to flow through the tapered portion away from the housing.

In yet another aspect of the invention, a method of removing a condensate produced by equipment during operation of the equipment, the method comprising inducing a flow of the condensate into a chamber through an inlet in the chamber; inducing the condensate to form into at least one of droplets and vapor; and exhausting the droplets and the vapor from the chamber to an area external to the chamber. Inducing the condensate to form into at least one of droplets and vapor includes vibrating the condensate within an ultrasonic frequency range. Exhausting the droplets and the vapor from the chamber includes forcing air to flow into the chamber such that the air flow induces air within the chamber and the droplets and the vapor to flow through an exhaust port provided by a wall of the chamber to an area external to the chamber.

Various aspects of the invention may provide one or more of the following advantages Liquids or condensates, e.g., water, produced during operation of equipment, e.g., air conditioning units and refrigeration and water-cooling systems, can be contained and removed from the equipment and/or areas external to the equipment, e.g., to help prevent dripping and puddling of water and to help prevent staining caused by dripping and/or standing water. Moisture and humidity can be reduced on surfaces of equipment and/or in areas external and proximate to and/or surrounding the equipment that promote the biological growth of disease-causing and/or odor-producing microbes. Reliability of cooling equipment, e.g., air conditioning units and refrigeration and water-cooling systems, can be increased. Existing cooling equipment can be retrofitted to provide drier, cleaner, healthier and odorless operation of the equipment. A self-contained condensate removal system with few moving and electrical parts can be provided to new or existing cooling equipment, and can substantially minimally disturb air around the system and/or the equipment. The formation of condensation on external surfaces of the system can be inhibited. Liquids and condensates can be vibrated to induce the liquids and condensates to form into manageable small droplets and/or vapors. Hot and/or warm air can be provided directly to liquid and condensate droplets and vapors to mix the droplets and vapors with the hot and/or warm air. Droplets and vapors can be influenced to evaporate.

These and other advantages of the invention, along with the invention itself, will be more fully understood after a review of the following figures, detailed description, and claims.

DETAILED DESCRIPTION OF PREFERRED EMBODIMENT

Figure 1:
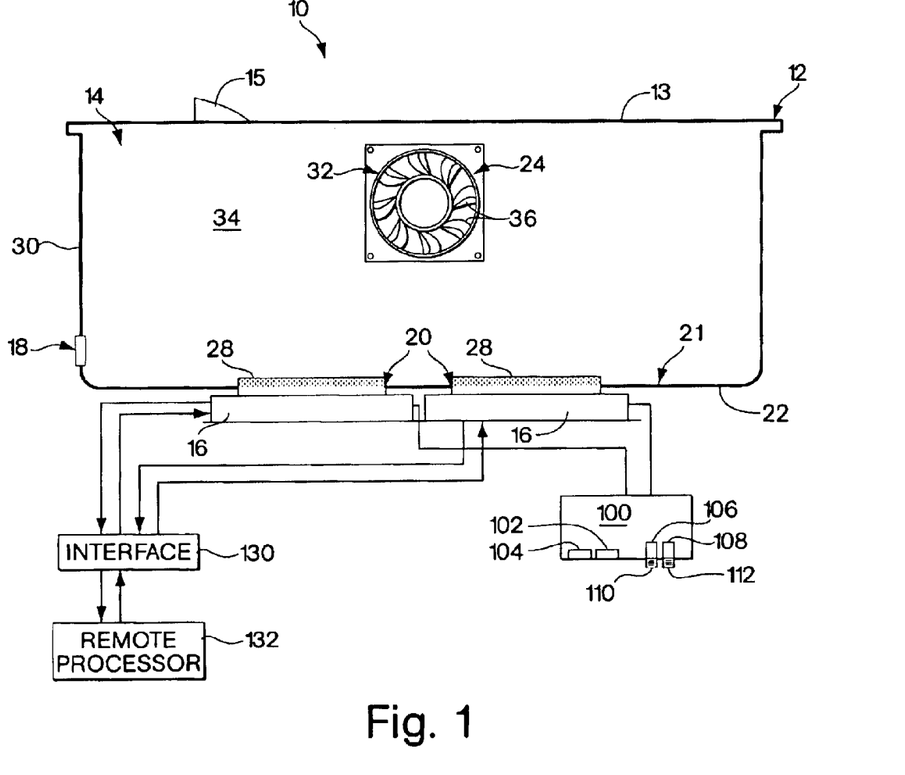
FIG. 1 is a side view of a condensate removal system with a fan.
Figure 2:
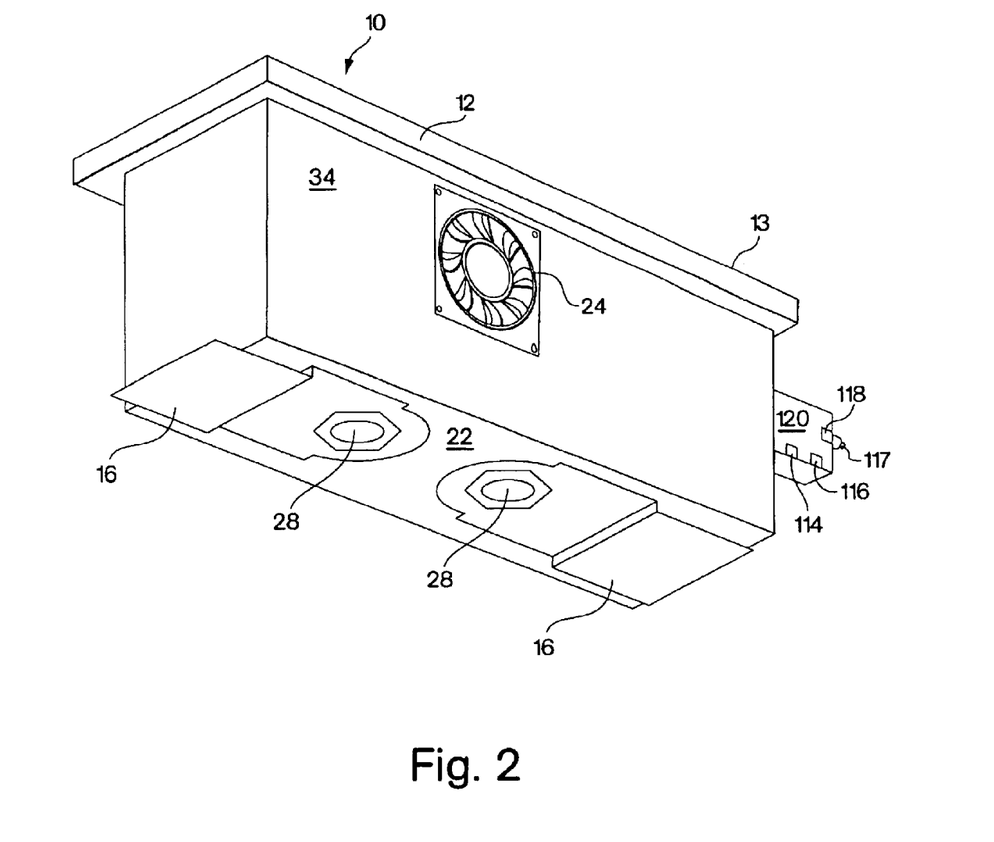
FIG. 2 is a perspective view of the system shown in FIG. 1.

Referring to FIGS. 1–2, in one aspect, a system 10 includes a trough 12, a condensate inlet 18, ultrasonic transducers 16, a fan 24 and electrical circuitry 100 to provide power to the transducers 16 and the fan 24. The trough 12 defines a chamber 14 and includes a top portion 13. In one embodiment, the top portion 13 can be configured as a movable or removable lid. The trough 12, e.g., a top portion 13, provides an exhaust port 15 configured to provide fluid communication between the chamber 14 and an area external to the chamber 14. The trough 12 further includes the inlet 18 disposed in a lower bottom portion of a side wall 30 of the trough 12. The inlet 18 is configured to receive and to provide a liquid or condensate, e.g., water, to the chamber 14, e.g., to an interior 21 of a bottom 22 of the trough 12. The inlet 18 can be disposed and configured for connection to equipment (not shown), e.g., an air conditioner unit or a refrigeration system. Alternatively, the inlet 18 can be disposed and configured to connect to a collection device (not shown), e.g., a condensate pan, that is associated with or connected to equipment and is configured to collect a liquid or condensate produced by the equipment during operation of the equipment. In addition, the inlet 18 can be disposed and configured for connection to a feed line (not shown) that connects the inlet 18 to the equipment and/or the collection device.

Two ultrasonic transducers 16 are spaced and connected by suitable connectors, e.g., screws, to an external surface of the bottom 22 of the trough 12. The bottom 22 of the trough 12 defines ports 20 under which the transducers 16 are disposed such that a transducer plate 28 of each transducer 16 is in fluid communication with the chamber 14 when the transducer 16 is connected to the external surface of the bottom 22 and is aligned and mated with its respective port 20. The transducer plates 28 are upward directed plates and are configured to vibrate in a required or desired ultrasonic frequency range, e.g., at about or above 1600 kHz. The transducer plates 28 are configured to vibrate a liquid or condensate in contact with one or both transducer plates 28 to thereby induce the liquid or condensate to form into droplets and/or vapor. Each transducer 16 can include a transducer well known in the art suitable for providing plate vibration in a required or desired frequency range. The transducer plates 28 can be constructed of a material suitable for vibration and for use in a moist environment including, but not limited to, a metal, e.g., aluminum and stainless steel.

Figure 3:
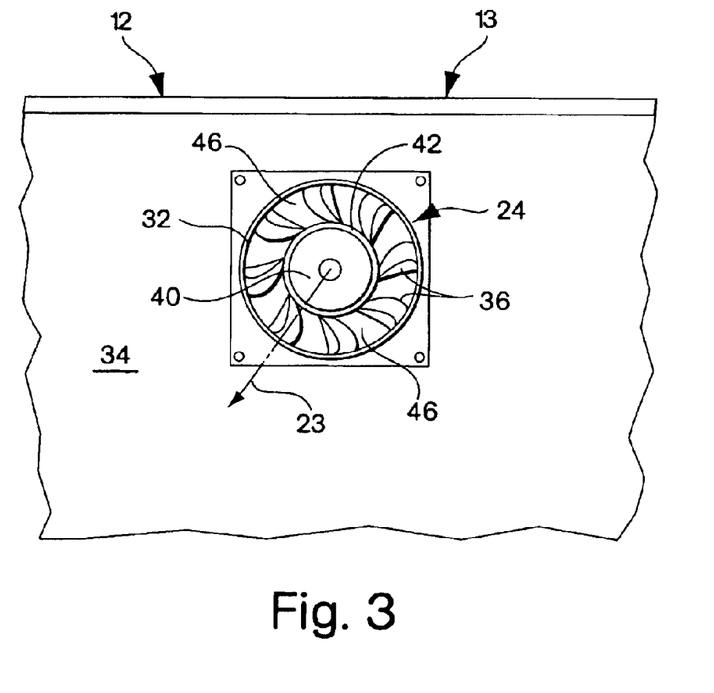
FIG. 3 is an interior perspective view of a fan of the system shown in FIG. 1.

Referring also to FIG. 3, the fan 24 is disposed in an upper portion of a side wall 34 of the trough 12 and connected to the side wall 34 by suitable connectors, e.g., screws. The side wall 34 defines a side port 32 in which the fan 24 is disposed such that when the fan 24 is connected to the side wall 34 and is aligned and mated with the side port 32, the fan 24 is in fluid communication with the chamber 14. The fan 24 is configured for inducing radially outward air flow from the fan 24 into the chamber 14, as shown by arrow 23 of FIG. 3, and is further configured to draw and to receive air from an area external to the trough 12 through the side port 32. The fan 24 can be a variable speed fan and can include, but is not limited to, backward curved impeller fan blades or axial fan blades. As shown in FIG. 3, the fan 24 is configured to rotate about a hub 40 that includes an internal motor (not shown), a fixed top portion 42 and a rotating lower portion 44 that can rotate relative to the top portion 42.

Blades or fins 36 of the fan 24 are angled relative to a radial direction of the fan 24 such that rotation of the lower portion 44 by the motor will draw air from an area external to the trough 12 through the side port 32 into an internal region 46 of the fan 24 in fluid communication with the chamber 14. The rotation of the fan 24 will force drawn-in air out of the fan 24 from the internal region 46 and radially outward into the chamber 14. The fan 24 thereby draws air from an area external to the trough 12 and forces air into the chamber 14 such that air exhausted from the fan 24 into the chamber 14 helps to create a flow of air in the chamber 14 that induces chamber air and droplets and/or vapor forming on and/or above the transducer plates 28 to flow substantially upward, away from the bottom 22 of the trough 12 and through the exhaust port 15 to expel the chamber air and the droplets and vapor from the trough 12.

The exhaust port 15 can be configured and connected to the trough 12 to help to induce a flow of and/or to expel the chamber air and the droplets and vapor directly to the atmosphere externally surrounding the trough 12. Alternatively, the exhaust port 15 can be configured and connected to the trough 12 for connection to a duct (not shown) such that the chamber air and the droplets and vapor can be induced to flow and/or are expelled through the exhaust port 15 into the duct (not shown). The duct can include an exhaust duct (not shown) configured to receive and to channel the chamber air and the droplets and vapor away from the trough 12. The exhaust duct can be associated with and/or connected to a condensing heat exchanger operatively coupled to cooling equipment, e.g., an air conditioner unit or a refrigeration system, that helps to remove heat from the equipment. The condensing heat exchanger can be cooled by passing air across the exchanger. The exhaust duct can be disposed and configured to help channel the resulting hot or warm air to the system 10. The chamber air and the droplets and vapor induced to flow and/or expelled through the exhaust port 15 into the exhaust duct mixes with the hot or warm air in the exhaust duct such that the droplets and vapor can evaporate due to a high surface to mass ratio of the droplets and vapor.

In a related aspect the duct can include a return duct (not shown) disposed and configured to channel the chamber air and the droplets and vapor, e.g., water droplets and water vapor, from the exhaust port 15 to cooling equipment, e.g., an air conditioner unit, a refrigeration system or a condensing heat exchanger associated with and/or connected to the equipment, to help to cool the equipment during operation.

The system 10 disclosed in reference to FIGS. 1–3 can be disposed and configured for association and/or connection to cooling equipment, e.g., an air conditioner unit, a refrigeration system or a condensing heat exchanger, or other equipment that produces condensate during operation, e.g., a heat pump or a heat pump system. The system can be disposed and configured for association and/or connection to such cooling equipment or other condensate-producing equipment on a high side or a "hot" side of the equipment. The high or "hot" side of cooling and/or other condensate-producing equipment is known in the art and typically refers to, e.g., a high temperature, high pressure refrigerant area including, but not limited to, an area in which a condensing heat exchanger, a liquid filter/drier and/or liquid tubing is disposed and/or located.

Referring to FIG. 1, the system 10 further includes the electrical circuitry 100 to supply power to the transducers 28 including two power ports 102, 104 to provide electrical redundancy. The two power ports 102, 104 are connected to two switches 106, 108, via fail-over circuitry 100. Each switch 106, 108 is electrically connected to one of the transducers 16. The power ports 102, 104 are configured to receive power cord connectors, e.g., standard three-prong connectors, or other connectors as appropriate for the power being supplied. The fail-over circuitry 100 is configured to connect the port 102 to the two switches 106, 108 in a normal mode. The circuitry 100 is further configured to detect a failure in power supply from the port 102 and in response to the detected failure, couple the port 104 to the switches 106, 108. The circuitry 100 is further configured to provide dual independent fusing of the transducers 16, such that if one of the transducers 16 fails, then only the other transducer 16 will receive operating power. An indication can be provided showing that one or both of the transducers 16 has been shut off.

The switches 106, 108 include respective buttons 110, 112 for selecting which, or both, transducers 16 will operate when the system 10 is powered up. Pressing on the buttons 110, 112 will actuate/de-actuate the respective switches 106, 108. Actuating the switches 106, 108 causes the switches 106, 108 to close, coupling the fail-over circuitry 100 to the transducers 16, and de-actuating the switches 106, 108 causes the switches 106, 108 to open, producing a break in the coupling of the circuitry 100 to the transducers 16. In one embodiment, the electrical circuitry 100 can be configured such that a frequency (kHz) at which transducers 16 operate is preset such that when the switches 106, 108 couple the circuitry 100 to the transducers 16, the transducers 16 operate at or about the preset frequency. In another embodiment, the buttons 110, 112, or separate selectors, may provide for selecting the settings of one or more frequency ranges (kHz) in which each transducer 16 operates. Alternatively, the settings of one or more frequency ranges (kHz) of operation of each transducer 16 may be selected remotely using a remote processor 132, e.g., a microprocessor or a PC-type computer, which is operatively coupled, e.g., via an interface 130, to the transducers 28. An indication can be provided showing the setting of a frequency range of vibration (kHz) and/or an actual frequency range at which each transducer 28 operates.

Referring to FIG. 2, the system 10 further includes electrical circuitry 120 to supply power to the fan 24 including two power ports 114, 116 to provide electrical redundancy. The two power ports 114, 116 are connected to a fan switch 118, via fail-over circuitry 120. The power ports 114, 116 are configured to receive power cord connectors, e.g., standard three-prong connectors, or other connectors as appropriate for the power being supplied. The fail-over circuitry 120 is configured to connect the port 114 to the fan switch 118 in a normal mode, and, when failure in the power supply from the port 114 is detected, to couple the port 116 with the fan switch 118. The circuitry 120 can also provide independent thermal protection to the fan 24. If the fan 24 is too hot during its operation, the circuitry 120 will shut the fan 24 off. An indication can be provided showing that the fan 24 is on or off. An actuating/de-actuating button 117 for turning the fan 24 on and off can be associated with the fan switch 118. Actuation of the button 117 causes the fan switch 118 to close and thereby couple the fail-over circuitry 120 to the fan 24 to provide electrical power when the system 10 is powered up. De-actuation of the button 117 causes the fan switch 118 to break the circuitry 120 coupling with the fan 24. The button 117, or other selector, can be used to set the speed of the fan 24. Alternatively, the setting of the speed of the fan 24 may be selected remotely using a remote processor, e.g., a microprocessor or PC-type computer, operatively coupled, e.g., via an interface, to the fan 24. In addition, an indication can be provided to show the setting of the speed of the fan 24 and the actual speed of the fan 24 during operation.

The trough 12 is preferably constructed of a material suitable for use with a liquid or condensate and/or for use with air conditioning or cooling equipment. The material includes, but is not limited to, a metal, a plastic or a combination of metal and plastic. The trough 12 is preferably constructed of a plastic resin suitable for forming the trough by a standard injection molding process known in the art. The plastic resin preferably includes a microbicide or an antimicrobial agent, e.g., one or more antiviral, antibacterial, and/or antifungal additives, that helps to prevent biological growth of disease-causing and/or odor-producing microbes, e.g., Legionella bacteria, in and/or on the trough 12 as a consequence of the presence of a liquid or condensate, e.g., water. Such an antimicrobial agent is added to the plastic resin before the molding process and includes, but is not limited to, an antimicrobial chemical additive manufactured for incorporation into plastic resins known as MICROBAN™ and available from Microban Products Company of Charlotte, N.C.

In addition, other components of the system 10 described above or other components associated with the system 10 can be constructed of a plastic resin incorporated with a microbicide or an antimicrobial agent such as MICROBAN™, including the condensate pan, the feed line, the inlet 18, the fan 24 and/or the exhaust port 15, as described above.

During operation of the system 10, liquids and/or condensates in contact with one or more of the components of the system 10 described above and comprised of a plastic resin including MICROBAN™ cause an amount of MICROBAN™ to leech from the plastic resin into the liquids and/or condensates. The MICROBAN™ acts as an antimicrobial agent in the liquids and/or condensates to help to prevent the growth of microbes in the liquids and/or condensates. The MICROBAN™ is effectively leeched from the plastic resin at a slow rate.

Figure 4:
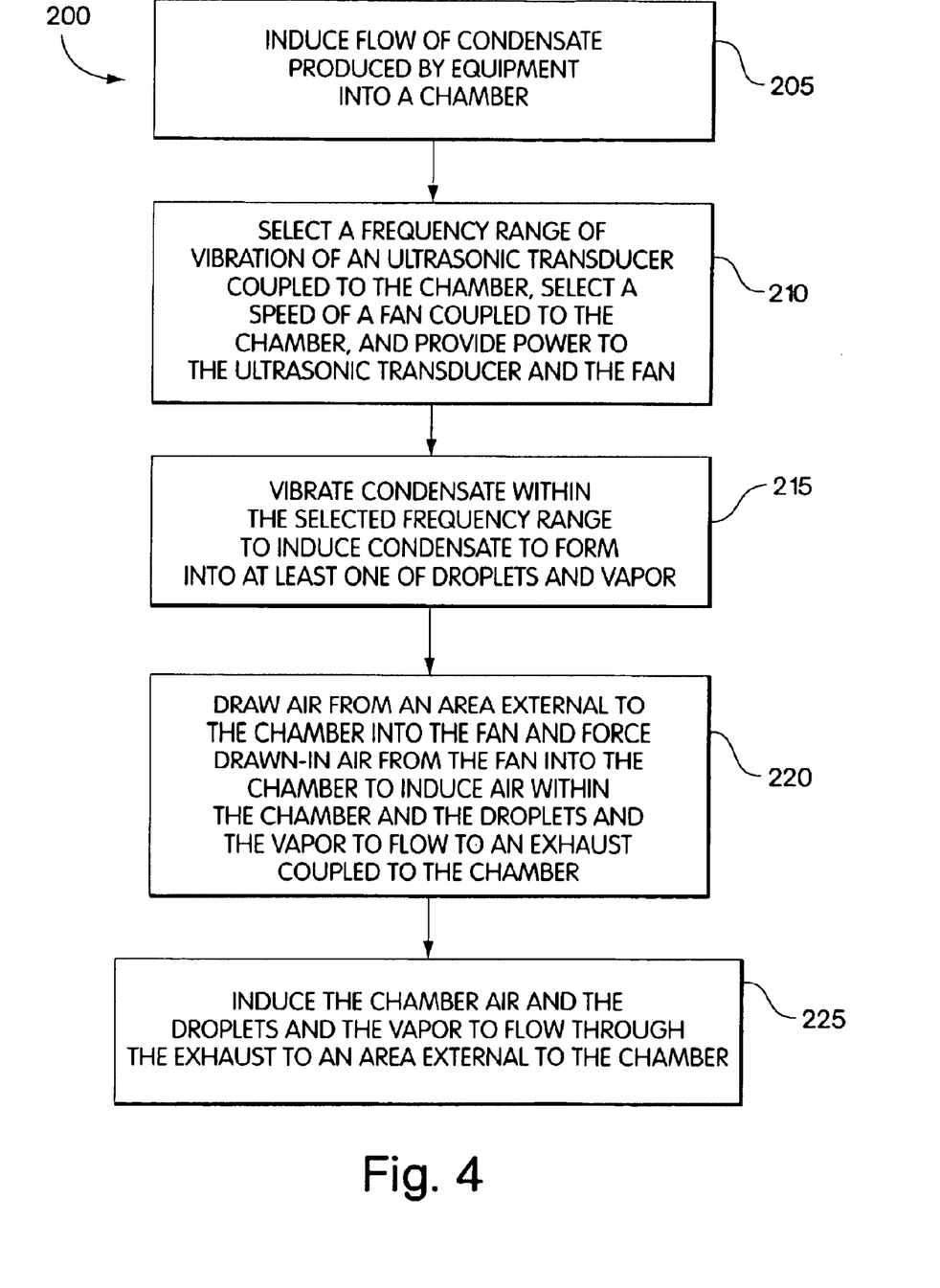
FIG. 4 is a block flow diagram of a process of removing a liquid or condensate produced by equipment during operation using the system shown in FIGS. 1–3.

In operation, referring to FIG. 4, with further reference to FIGS. 1–3, a process 200 for removing a liquid or condensate, e.g., water, produced by equipment, e.g., an air conditioner unit or a refrigeration system, during operation of the equipment includes the stages shown. The process 200, however, is exemplary only and not limiting. The process 200 can be altered, e.g., by having stages added, removed or rearranged.

At stage 205, water or water condensate produced by the equipment during its operation is induced to flow into the trough 12 and/or to the inlet 18. The inlet 18 is configured to provide the water into the chamber 14.

At stage 210, a user selects a speed at which the fan 24 should operate by manually or remotely setting the fan 24 to a desired speed. In one embodiment, the user additionally selects a frequency range (kHz), e.g., an ultrasonic frequency range, within which the transducers 16 operate by either manually or remotely setting each transducer 16 to a desired frequency range of vibration. The system 10 is powered on to drive the fan 24 and the transducers 16.

At stage 215, the transducers 16 vibrate the transducer plates 28 within the selected ultrasonic frequency range. The transducers 16 cause the water in contact with a surface of one or both transducer plates 28 to form into water droplets and/or water vapor on and/or above the transducer plates 28.

At stage 220, the fan blades or fins 36 rotate thereby drawing air from an area external to the fan 24 through the blades or fins 36 into the internal region 46 of the fan 24 and forcing drawn-in air from the fan 24 radially outward into the chamber 14. The action of the fan blades or fins 36 causes a flow of air within the chamber 14 that helps to induce the water droplets and water vapor forming on and/or above the transducer plates 28 to flow substantially upward, away from the bottom 22 of the trough 12 and the transducer plates 28 to the exhaust port 15.

At stage 225, the chamber air and the water droplets and water vapor flow are induced to flow and/or are expelled through the exhaust port 15 to an area external to the trough 12, e.g., the atmosphere externally surrounding the trough 12 or an external duct (not shown) coupled with the exhaust port 15 and configured to receive and to channel exhausted chamber air and the water droplets and water vapor away from the trough 12.

Figure 5:
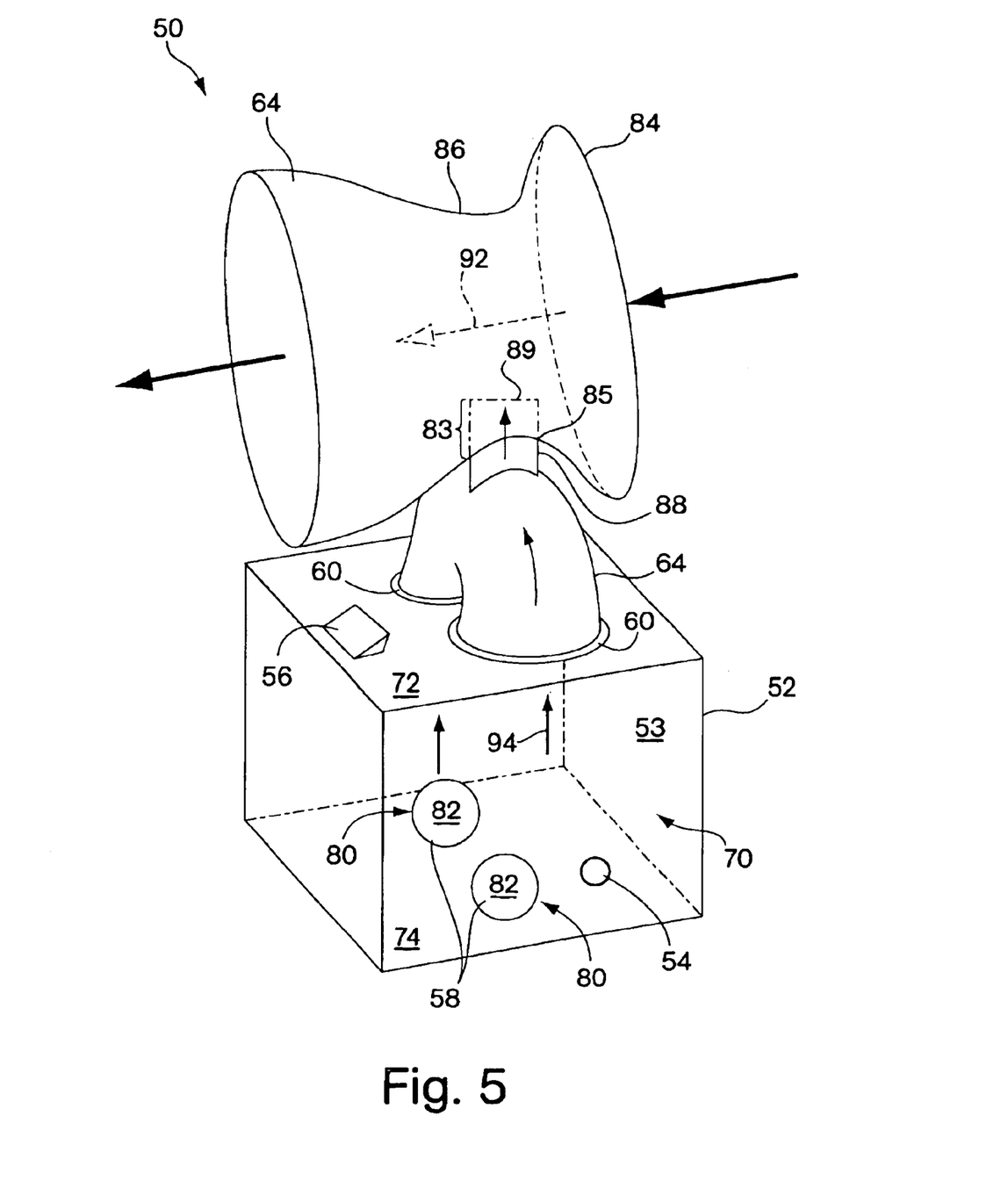
FIG. 5 is a perspective view of a condensate removal system with a nozzle.
Figure 6:
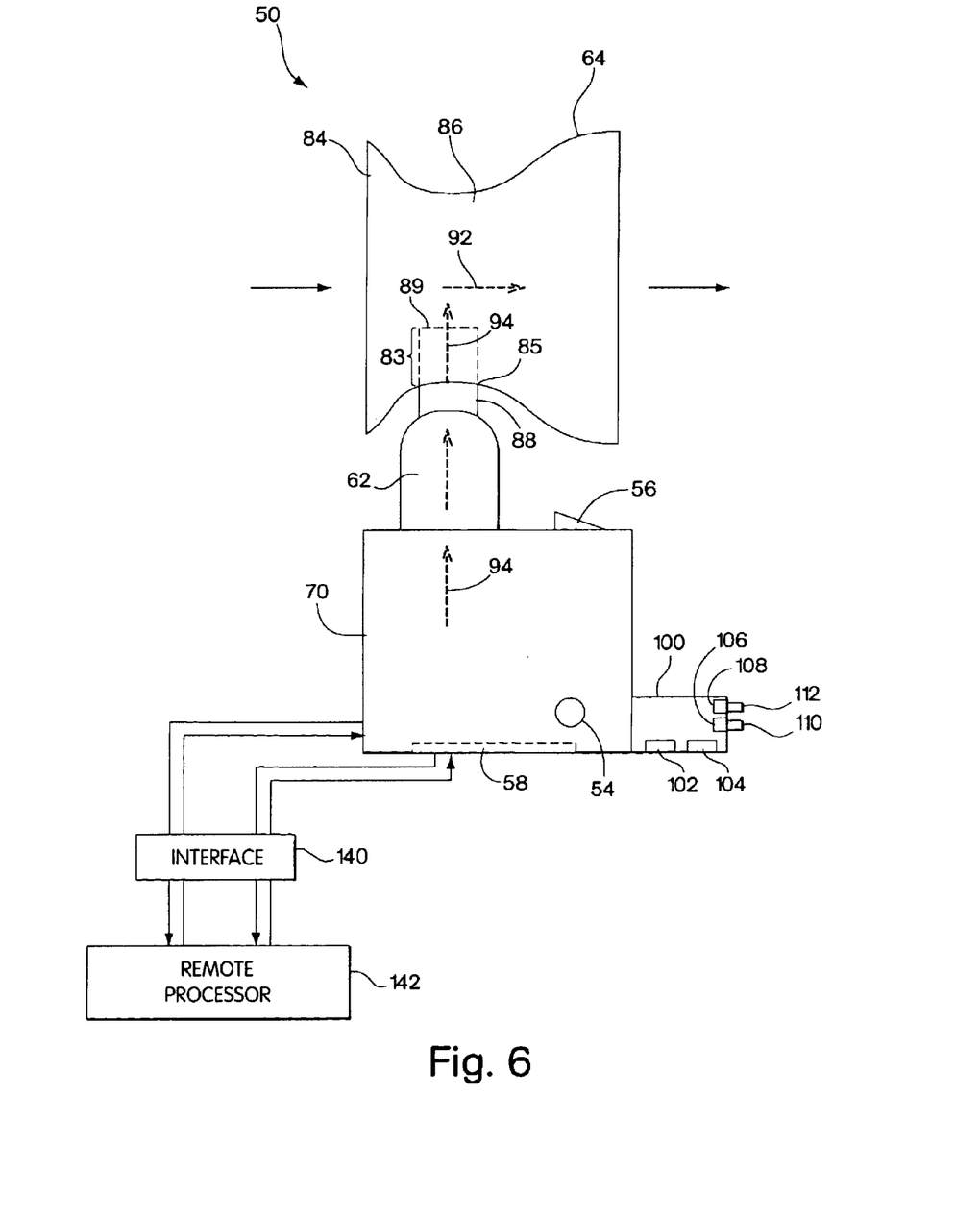
FIG. 6 is a side view of the system shown in FIG. 5.

Referring to FIGS. 5–6, in another aspect, a condensate removal system 50 includes a housing 52, a condensate inlet 54, a gas inlet 56, ultrasonic transducers 58, exhaust ports 60, an exhaust duct 62, an exhaust nozzle 64 and electrical circuitry 100 to drive the transducers 58.

The housing 52 defines a chamber 70 and includes the condensate inlet 54 disposed in a lower bottom portion of a side wall 53 of the housing 52. The inlet 54 is configured to receive and to provide a liquid or condensate, e.g., water, into the chamber 70 at a bottom 74 of the housing 52. The inlet 54 can be disposed and configured for connection to equipment (not shown), e.g., an air conditioner unit or a refrigeration system, to receive and to capture a liquid or condensate produced by the equipment during operation. Alternatively, the inlet 54 can be disposed and configured for connection to a collection device (not shown), e.g., a condensate pan, that is associated with or connected to equipment and is configured to collect a liquid or condensate produced by the equipment during operation of the equipment. The inlet 54 can be disposed and configured for connection to a feed line (not shown) that connects the collection device and/or the equipment to the inlet 54.

A top 72 of the housing 52 defines the gas, e.g., air, inlet 56. The inlet 56 helps to provide ambient air to the chamber 70 and to help maintain the chamber 70 at atmospheric pressure.

The two ultrasonic transducers 58 are spaced and connected by suitable connectors, e.g., screws, to an external surface of the bottom 74 of the housing 52. The bottom 74 of the housing 52 defines ports 80 under which the transducers 58 are disposed such that a transducer plate 82 of each transducer 58 is in fluid communication with the chamber 70 when the transducer 58 is connected to the bottom 74 of the housing 52 and is aligned and mated with its respective port 80. The transducer plates 58 are upward directed plates and configured to vibrate in a required or desired frequency range, e.g., at about or above 1600 kHz. The transducer plates 58 are configured to vibrate a liquid or condensate in contact with one or both transducer plates 58 to thereby induce the liquid or condensate to form into droplets and/or vapor. Each transducer 58 can include a transducer well known in the art suitable for providing plate vibration in a required or desired range of frequency. The transducer plates 58 can be constructed of a material suitable for vibration and for use in a moist environment including, but not limited to, a metal, e.g., aluminum and stainless steel.

The top 72 of the housing 52 can define at least one exhaust port 60. As shown in FIG. 5, two exhaust ports 60 are disposed at the top 72 and each exhaust port 60 is substantially above and aligned with one of the transducers 58 and is configured to have an area that substantially spans an area of the transducer plate 82.

The exhaust duct 62 is connected to the top 72 of the housing 52 by suitable connectors, e.g., screws. The exhaust duct 62 is configured to be disposed above and to mate with the exhaust ports 60 such that when the exhaust duct 62 is connected to the top 72 of the housing 52 and is aligned and coupled to the exhaust ports 60, the exhaust duct 62 is in fluid communication with the chamber 70. The exhaust duct 62 is configured to help channel a gas, e.g., air, to flow from the chamber 70 into the exhaust duct 62 when the gas is drawn from the chamber 70 into the exhaust duct 62. The exhaust duct 62 is further configured to help guide the gas substantially upward, away from the bottom 74 of the housing 52. As shown in FIGS. 5–6, the exhaust duct can be configured as a cylinder being substantially U-shape and having a circular cross-section. A first terminal open end of the exhaust duct 62 aligns and mates with one exhaust port 60 and a second terminal open end of the duct 62 aligns and mates with a second exhaust port 60 when the exhaust duct 62 in connected to the top 72 of the housing 52.

The exhaust duct 62 can include a connecting portion 88 connected to an upper portion of the exhaust duct 62. The connecting portion 88 can be disposed and configured to connect the exhaust duct 62 to the nozzle 64 and to place the chamber 70 and the exhaust duct 62 in fluid communication with the nozzle 64. The connecting portion 88 can be further configured to help channel a chamber gas into the exhaust duct 62 and into the nozzle 64 when the chamber gas is drawn from the exhaust duct 62.

An inlet port 85 defined by the nozzle 64 is configured and sized to receive a segment 83 of the connecting portion 88 such that the segment 83 extends into the nozzle 64 interior, as shown in FIG. 5. The segment 83 includes an open terminal end 89 that helps to emit or vent a chamber gas into the nozzle 64. Other configurations and arrangements of the exhaust duct 62, the nozzle 64 and/or the connecting portion 88 are within the scope of the invention to place the chamber 70 and the exhaust duct 62 in fluid communication with the nozzle 64. The invention is not limited to the configuration and arrangement of the exhaust duct 62, the connecting portion 88 and the nozzle 64 shown in FIGS. 5–6, but anticipates other configurations and arrangements to join or connect the exhaust duct 62 to the nozzle 64 such that the exhaust duct 62 and the nozzle 64 are in fluid communication.

The nozzle 64 is configured to contain a gas, e.g., air, and further configured to channel air through the nozzle 64 when the air is supplied to the nozzle 64. The nozzle 64 can be configured and arranged in relation to the chamber 70 such that air flows through the nozzle 64 in a substantially perpendicular orientation, as arrows 92 show in FIGS. 5–6, to a direction in which air within the chamber 70 flows from the chamber 70 and from the exhaust duct 62, as arrows 94 show in FIGS. 5–6, when the air is drawn from the chamber 70. The nozzle 64 can be further configured and arranged such that as air flows through the nozzle 64, air flows across, e.g. over, an area defined by the open terminal end 89 of the segment 83 that extends into the nozzle 64 interior, as the arrows 92 show in FIGS. 5–6.

The nozzle 64 includes a tapered portion 84, 86. The tapered portion 84, 86 is configured to contain air flowing through the nozzle 64 and to help to constrict air as it flows through the tapered portion 84, 86. Air flows from a first area 84 of the tapered portion 84, 86 to a second area 86 of the tapered portion 84, 86. The second area 86 has a smaller cross-section and/or narrower diameter than a cross-section and/or diameter of the first portion 84 such that when air flows from the first area 84 to the second area 86, the air is constricted. As air is constricted, the air increases in velocity and a pressure of the air correspondingly decreases. The resulting high speed, low pressure air flowing through the tapered portion 84, 86 produces suction or a drawing action that is referred to in the art as the Venturi effect.

As shown in FIG. 5, the first area 84 includes a circular cross-section of a given diameter and the second area 86 includes a circular cross-section with a diameter smaller than the given diameter of the first area 84. The exhaust duct 62 can be connected to the nozzle 64, e.g., via the connecting portion 88, at the second area 86 of the tapered portion 84, 86. As air flows through the tapered portion 84, 86, the air is drawn down from the first area 86 into the narrower second area 86. The reducing diameter of the tapered portion 84, 86 helps to constrict air to help increase the air velocity and to help decrease the air pressure.

High speed, low pressure air flowing through the tapered portion 84, 86 helps to draw air within the chamber 70 and droplets and vapor forming on and/or above the transducer plates 82 substantially upward, away from the bottom 74 of the housing 52 through the exhaust duct 62 and the connecting portion 88 into the nozzle 64, as the arrows 94 show in FIGS. 5–6. In addition, high speed, low pressure air helps to entrain the chamber air and the droplets and vapor to remove the chamber air and the droplets and vapor from the connecting portion 88 and to help to pull the chamber air and the droplets and vapor through the nozzle 64 away from the housing 52.

As air flows through the tapered portion 84, 86, a pressure differential is created between the air flowing through the tapered portion 84, 86, e.g., at less than atmospheric pressure, and air within the chamber 70, the exhaust duct 62 and the connecting portion 88, e.g., at atmospheric pressure, such that resistance to a flow of the air from the chamber 70 into the nozzle 64 when the air is drawn from the chamber 70 is at least minimized or reduced.

The nozzle 64 can be disposed and configured for connection to an external duct (not shown) associated with and/or connected to a condensing heat exchanger (not shown) of an air conditioner unit, a refrigeration system or other cooling equipment. The external duct can be configured to channel a flow of hot or warm gas, e.g., air, produced when the air is passed across the condensing heat exchanger during operation of the equipment to help cool the heat exchanger. The external duct can be configured to channel the flow of the hot or warm condensate air from the condensing heat exchanger into the nozzle 64. The hot or warm air can mix with the droplets and vapor drawn into the nozzle 64 to help evaporate the droplets and vapor due to a high surface area to mass ratio of the droplets and vapor.

In addition, the nozzle 64 can be disposed and configured for connection downstream to a return duct (not shown). The return duct can be configured to channel and to return the chamber 70 air and the droplets and vapor to an air conditioner unit, a refrigeration system, or other cooling equipment and/or to a condensing heat exchanger associated with and/or connected to such equipment to help to cool the heat exchanger during operation of the equipment.

The system 50 disclosed in reference to FIGS. 5–6 can be disposed and configured for association and/or connection to cooling equipment, e.g., an air conditioner unit, a refrigeration system or a condensing heat exchanger, or other equipment that produces condensate during operation, e.g., a heat pump or a heat pump system. The system can be disposed and configured for association and/or connection to such cooling equipment or other condensate-producing equipment on a high side or a "hot" side of the equipment. The high or "hot" side of cooling or other condensate-producing equipment is known in the art and typically refers to, e.g., a high temperature, high pressure refrigerant area including, but not limited to, an area in which a condensing heat exchanger, a liquid filter/drier and/or liquid tubing is disposed and/or located.

Referring to FIG. 6, the system 50 further includes the electrical circuitry 100 to supply power to the transducers 58 similar to the electrical circuitry employed to drive the transducers 16 of the system 10 described above in reference to FIGS. 1–2. In one embodiment, the electrical circuitry 100 can be configured such that a frequency (kHz) at which transducers 58 operate is preset such that when the switches 106, 108 couple the circuitry 100 to the transducers 58, the transducers 58 operate at or about the preset frequency. In another embodiment, the buttons 110, 112, or separate selectors, may provide for selecting the settings of one or more frequency ranges (kHz) in which each transducer 58 operates. The buttons 110, 112, or separate selectors, may provide for selecting the settings of one or more frequency ranges of operation of each transducer. 58. Alternatively, the settings of one or more frequency ranges of operation of each transducer 58 may be selected remotely using a remote processor 142, e.g., a microprocessor or a PC-type computer, which is electrically coupled, e.g., via an interface 140, to the transducers 58. An indication can be provided showing the setting of a frequency range of vibration actual frequency range at which each transducer 58 operates.

The housing 52, the exhaust duct 62, the connecting portion 88 and/or the nozzle 64 are constructed of a material suitable for use with a liquid or condensate and/or for use with gas conditioning or cooling equipment. The material includes, but is not limited to, a metal, a plastic or a combination of metal and plastic. The housing 52, the exhaust duct 62, the connecting portion 88 and/or the nozzle 64 are preferably constructed of a plastic resin wherein one or more of such components described above are formed by a standard injection molding process well known in the art. As described in reference to the trough 12 of FIGS. 1–3, the housing 52, the exhaust duct 62, the connecting duct 90 and/or the nozzle 64 can be constructed of a plastic resin incorporated with a microbicide or an antimicrobial agent such as MICROBAN™ that is added before the injection molding process. The antimicrobial agent helps to prevent biological growth of undesirable disease-causing and/or odor-producing microbes in and/or on surfaces of such components of the system 50 due to the presence of a liquid or condensate.

During use of the system 50, liquids and/or condensates in contact with one or more of the components of the system 50 described above and comprised of a plastic resin including MICROBAN™ cause MICROBAN™ to leech from the plastic resin into the liquids and/or condensates. The MICROBAN™ thereby acts as an antimicrobial agent in the liquids and/or condensates to help to prevent growth of microbes in the liquids and/or condensates. In effect, the MICROBAN™ is leeched at a slow rate from the plastic resin.

Figure 7:
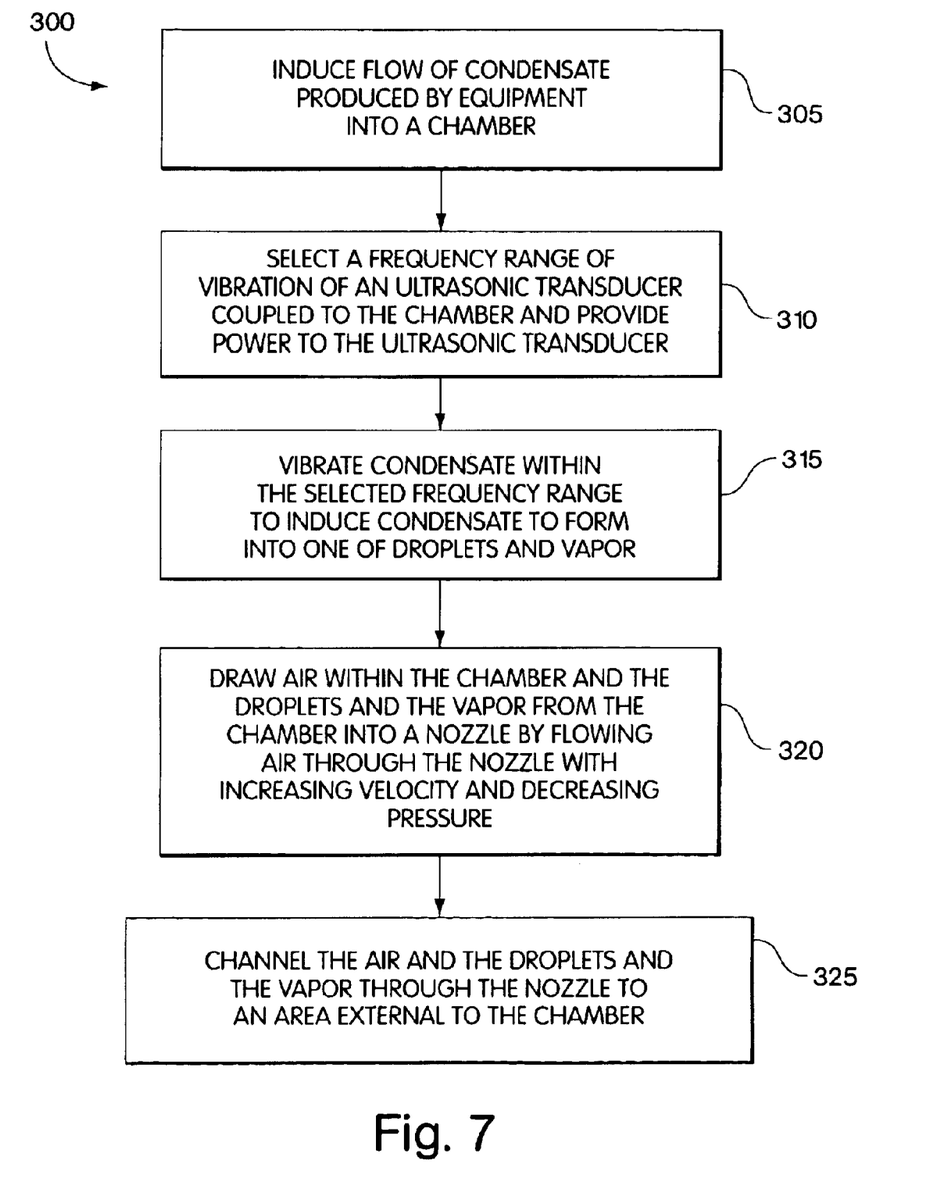
FIG. 7 is a block flow diagram of a process of removing a liquid or condensate produced by equipment during operation using the system shown in FIG. 5.

In operation, referring to FIG. 7, with further reference to FIGS. 5–6, a process 300 for removing a liquid or condensate, e.g., water, produced by equipment, e.g., an air conditioner unit or a refrigeration system, during operation of such equipment includes the stages shown. The process 300, however, is exemplary only and not limiting. The process 300 can be altered, e.g., by having stages added, removed or rearranged.

At stage 305, water or water condensate produced by the equipment during its operation is induced to flow to the housing 52 and to the inlet 54. The inlet 54 is disposed and configured to provide the water into the chamber 70.

At stage 310, a user selects a frequency range (kHz) within which the transducers 58 operate by manually or remotely setting each transducer 58. The system 50 is powered on to drive the transducers 58.

At stage 315, the transducers 58 vibrate the transducer plates 82 within the selected frequency range of vibration such that water in contact with a surface of one or both of the transducer plates 82 is induced to form into water droplets and/or water vapor on and/or above the transducer plates 28.

At stage 320, the nozzle 64 and the tapered portion 84, 86 are configured and arranged such that when a gas, e.g., air, flows through the tapered portion 84, 86, the gas flows with increasing velocity and decreasing pressure to thereby help produce suction or a drawing action into the tapered portion 84, 86. The drawing action of the high speed, low pressure air helps to cause a gas, e.g., air, in the chamber 70 and the water droplets and water vapor forming on and/or above the transducer plates 82 to be drawn substantially upward, away from the bottom 74 of the housing 52 and the transducer plates 82 through the exhaust ports 60 into the exhaust duct 62 and the connecting portion 88 and into the nozzle 64. A pressure differential between the high speed, low pressure air of the nozzle 64, e.g., below atmospheric pressure, and the atmospheric pressure of the chamber air of the chamber 70, the exhaust duct 62 and the connecting duct 90 helps to at least minimize resistance to a flow of the chamber air and the water droplets and vapor into the nozzle 64 when the chamber air and the water droplets and vapor are drawn from the chamber 70.

In stage 325, the nozzle 64 channels the chamber air and the water droplets and water vapor to an area external to the housing 52, e.g., the atmosphere externally surrounding the housing 52 or a duct coupled with the nozzle 64 and configured to receive and to channel the chamber air and the water droplets and water vapor away from the housing 52.

Figure 8:
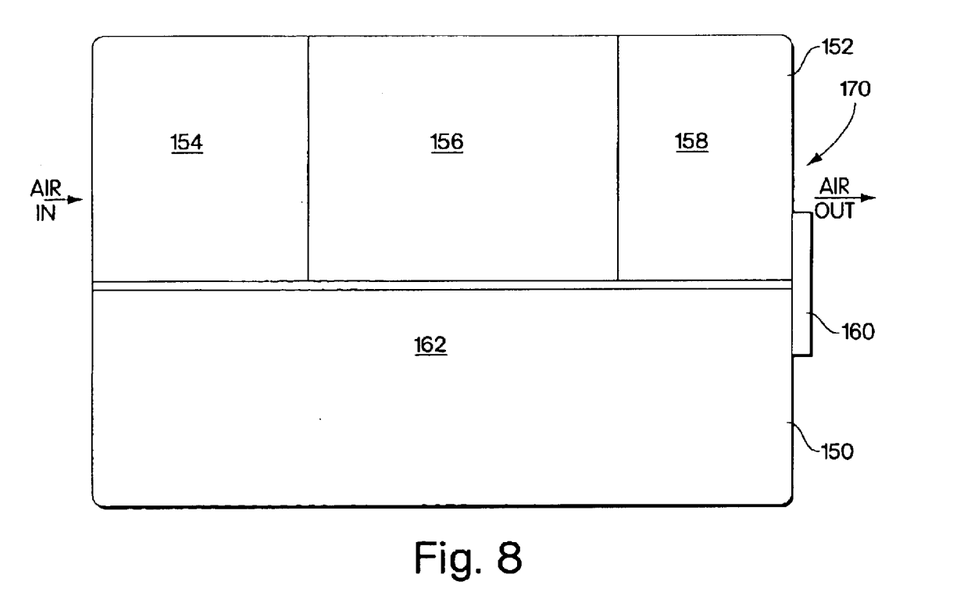
FIG. 8 is a perspective view of an air conditioning system including one of the system shown in FIGS. 1–3 and the system shown in FIGS. 5–6.

Referring to FIG. 8, a condensate removal system 150 is provided that is configured and arranged such that the system 150 is associated with and/or operatively coupled to cooling equipment 152, e.g., an air conditioner unit or other air handling or conditioning equipment, including an inlet 154 to draw or supply air into the equipment 152 for cooling, a cooling assembly 156, e.g., including one or more cooling coils, to cool air brought into the equipment 152 through the inlet 154, and an exhaust system 158, e.g., including one or more fans or other means, to help vent cool air from the equipment 152. The system 150 can be disposed such that the system 150 helps to collect and to receive a liquid or condensate, e.g., water, produced by the equipment 152 during operation of the equipment 152.

As shown in FIG. 8, in one embodiment, the system 150 can be disposed and configured such that the system 150 is operatively connected to the equipment 152 at an exhaust side 170 of the equipment 152. In another embodiment, the system 150 can be disposed and configured such that it is operatively connected to the equipment 152 at a high or "hot" side of the equipment 152 as described above in reference to the system 10 of FIGS. 1–3 and the system 50 of FIGS. 5–6. In another embodiment, the system 150 can be operatively connected to the equipment 152 via a collection device 160 wherein the collection device 160 is configured and operatively connected to the equipment 152 to capture or to receive condensate produced by the equipment during operation. In still another embodiment, the exhaust system 158 of the equipment 152 can include a condensing heat exchanger (not shown) and the condensate removal system 150 can be disposed and configured to operatively couple to the condensing heat exchanger such that vapor and droplets the system 150 forms and exhausts during operation can be evaporated by a warm or hot air stream exhausted by the condensing heat exchanger.

The system 150 shown in FIG. 8 can be further disposed and configured to receive water produced by the equipment 152 and to supply water into a chamber 162 provided by the system 150 wherein the water is induced to form into water droplets and/or water vapor. The system 150 can include the condensate removal system 10 as described above in reference to FIGS. 1–3, or the condensate removal system 50 as described above in reference to FIGS. 5–6.

Other embodiments are within the scope and spirit of the appended claims. For example, the condensate removal system can be constructed of other materials than the materials described above for use in handling and removing other types of liquids and condensates produced as a consequence of the operation of equipment in various industrial applications. In particular, the condensate removal system including the nozzle can be constructed of compatible materials and appropriately configured and arranged for use in handling and removing a hazardous, toxic and/or volatile liquid or condensate produced by equipment as a product of its operation, and, in particular, in applications in which a fan is not used to handle and dispose a liquid or condensate due to environmental or safety concerns and/or regulations.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. A condensate removal system for use with equipment that produces condensate during operation, the system comprising:
    a trough, the trough defining a chamber and a first port, the first port configured to provide fluid communication between the chamber and an area external to the trough, the trough further providing an exhaust port, the exhaust port being configured to provide fluid communication between the chamber and an area external to the trough;
    a fan connected to the trough and aligned with and coupled to the first port such that the fan is in fluid communication with the chamber, the fan being configured to draw and to receive air from an area external to the trough and being further configured to force drawn-in air into the chamber such that air within the chamber is induced to flow from the chamber through the exhaust port to an area external to the trough;
    an inlet connected to the trough, the inlet configured to receive the condensate from the equipment and to provide the condensate into the chamber, the inlet being further disposed and configured to operatively couple to one of the equipment and a collection device associated with the equipment; and
    at least one ultrasonic transducer coupled to the trough to provide ultrasonic vibration to condensate contained in the trough.

2. The system of claim 1 wherein the equipment includes an air conditioning system and the condensate removal system is disposed and operatively coupled to a hot side of the air conditioning system.

3. The system of claim 1 wherein the collection system associated with the equipment includes a condensate collection device associated with an air conditioning system, and the condensate removal system is disposed and operatively coupled to the condensate collection device at a hot side of the air conditioning system.

4. The system of claim 1 further comprising multiple power inputs and a circuitry module electrically coupling the power inputs to the fan and the ultrasonic transducer.

5. The system of claim 1 wherein the ultrasonic transducer is aligned with and coupled to a second port defined by a bottom of the trough, the second port configured such that the ultrasonic transducer is in fluid communication with the chamber, the ultrasonic transducer further configured to operate in an ultrasonic frequency range.

6. The system of claim 5 further comprising a second ultrasonic transducer coupled to the trough to provide ultrasonic vibration to condensate contained in the trough.

7. The system of claim 6 wherein the second ultrasonic transducer is aligned with and coupled to a third port defined by the bottom of the trough, the third port configured such that the second ultrasonic transducer is in fluid communication with the chamber, the second ultrasonic transducer further configured to operate in an ultrasonic frequency range.

8. The system of claim 1 wherein the trough is constructed of a material selected from the group consisting of a metal, a plastic and a combination thereof.

9. The system of claim 8 wherein the material includes a plastic containing an antimicrobial agent.

10. The system of claim 1 operatively coupled to one of: (i) cooling equipment, (ii) an air conditioning system; (iii) an air cooling system, (iv) a refrigeration system, (v) a heat pump, and (vi) a heat pump system.

11. A condensate removal system for use with equipment that produces condensate during operation, the system comprising:
   a housing, the housing defining a chamber and a first port, the first port configured to provide fluid communication between the chamber and an area external to the housing;
   an inlet connected to the housing, the inlet configured to receive the condensate from the equipment and to provide the condensate into the chamber, the inlet further disposed and configured to operatively couple to one of the equipment and a collection device associated with the equipment; and
   a nozzle connected to the housing and being configured such that a side of the nozzle couples to the first port and the nozzle is in fluid communication with the chamber, the nozzle comprising a tapered portion, the tapered portion being disposed and configured to induce air to flow through the tapered portion and across an area defined by the first port and being further configured such that when air flows through the tapered portion, the air increases velocity and decreases in pressure and draws air within the chamber from the chamber into the tapered portion.

12. The system of claim 11 wherein the tapered portion is further configured such that the air flowing through the tapered portion induces the chamber air to flow through the tapered portion away from the housing.

13. The system of claim 12 wherein the tapered portion is further configured and arranged such that the air flows across the area defined by the first port in a substantially perpendicular orientation to a direction in which the chamber air flows through the first port.

14. The system of claim 11 further comprising an ultrasonic transducer coupled to the housing to provide ultrasonic vibration to condensate contained in the chamber.

15. The system of claim 14 further comprising multiple power inputs and a circuitry module electrically coupling the power inputs to the ultrasonic transducer.

16. The system of claim 14 wherein the ultrasonic transducer is aligned with and coupled to a second port defined by a bottom of the housing, the second port configured such that the ultrasonic transducer is in fluid communication with the chamber.

17. The system of claim 14 further comprising a second ultrasonic transducer coupled to the housing to provide ultrasonic vibration to condensate contained in the chamber.

18. The system of claim 17 wherein the second ultrasonic transducer is aligned with and coupled to a third port defined by the bottom of the trough, the third port configured such that the second ultrasonic transducer is in fluid communication with the chamber.

19. The system of claim 11 wherein the housing is constructed of a material containing an antimicrobial agent.

20. The system of claim 11 operatively coupled to one of: (i) cooling equipment, (ii) a gas conditioning system, (iii) a gas cooling system, (iv) a refrigeration system, (v) a heat pump, and (vi) a heat pump system.

21. An air conditioning system comprising:
   an inlet that draws air into the system;
   a cooling assembly to cool the air brought through the inlet into the system;
   an exhaust assembly to vent cool air from the system; and
   a condensate removal system coupled to the system including
      a housing defining a chamber and an inlet, the inlet configured to receive condensate produced by the system and to provide the condensate into the chamber; and
      means for inducing the condensate to flow from the chamber as one of droplets and vapor
      wherein the condensate removal system is disposed and operatively coupled to the air conditioning system at an exhaust side of the air conditioning system.

22. The system of claim 21 wherein the condensate removal system is operatively coupled to a condensing heat exchanger disposed at and operatively connected to a hot side of the air conditioning system.

23. The system of claim 21 wherein the means for inducing the condensate to flow from the chamber as one of droplets and vapor includes an ultrasonic transducer coupled to the housing to provide ultrasonic vibration to the condensate contained in the chamber.

24. The system of claim 23 further comprising multiple power inputs and a circuitry module electrically coupling the power inputs to the air conditioning system and the ultrasonic transducer.

25. The system of claim 23 wherein the means for inducing the condensate to flow from the chamber as one of droplets and vapor further includes a fan coupled to the housing such that the fan is in fluid communication with the chamber, the fan being configured to draw and to receive air from an area external to the housing and to force a radially outward flow of air into the chamber such that air within the chamber and the droplets and the vapor are induced to flow fro the chamber through an exhaust port provided by the housing to an area external to the housing.

26. The system of claim 23 wherein the means for inducing the condensate to flow from the chamber as one of droplets and vapor further includes a nozzle coupled to the housing such that the nozzle is in fluid communication with the chamber, the nozzle comprising a tapered portion, the tapered portion being disposed and configured such that when air flows through the tapered portion, the air increases velocity and decreases in pressure and draws the droplets and the vapor from the chamber into the tapered portion.

27. The system of claim 26 wherein the tapered portion is further configured such that the air flowing through the tapered portion induces the droplets and the vapor to flow through the tapered portion away from the housing.

28. A method of removing a condensate produced by equipment during operation of the equipment, the method comprising:

inducing a flow of the condensate into a chamber through an inlet in the chamber;

inducing the condensate to form into at least one of droplets and vapor; and exhausting the droplets and the vapor from the chamber to an area external to the chamber.

29. The method of claim 28 wherein inducing the condensate to form into at least one of droplets and vapor includes vibrating the condensate within an ultrasonic frequency range.

30. The method of claim 28 wherein exhausting the droplets and the vapor from the chamber includes forcing air to flow into the chamber such that the air flow induces air within the chamber and the droplets and the vapor to flow through an exhaust port provided by a wall of the chamber to an area external to the chamber.

* * * * *